(12) United States Patent  
Mont et al.

(10) Patent No.: US 9,137,113 B2
(45) Date of Patent: Sep. 15, 2015

(54) SYSTEM AND METHOD FOR DYNAMICALLY ALLOCATING RESOURCES

(75) Inventors: Marco Casassa Mont, Bristol (GB); Siani Lynne Pearson, Bristol (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 3101 days.

(21) Appl. No.: 11/335,877

(22) Filed: Jan. 20, 2006

(65) Prior Publication Data

US 2006/0190986 A1 Aug. 24, 2006

(30) Foreign Application Priority Data

Jan. 22, 2005 (GB) .................................. 0501392.5

(51) Int. Cl.
*H04L 29/06* (2006.01)
*H04L 12/24* (2006.01)
*H04L 9/08* (2006.01)

(52) U.S. Cl.
CPC ............ *H04L 41/0893* (2013.01); *H04L 9/083* (2013.01); *H04L 63/102* (2013.01); *H04L 63/0428* (2013.01)

(58) Field of Classification Search
CPC ... H04L 41/0893; H04L 9/083; H04L 63/102; H04L 63/0428
USPC ............. 726/1–4, 21; 713/155, 193; 380/258; 707/9
See application file for complete search history.

(56) References Cited

U.S. PATENT DOCUMENTS

| 6,658,573 | B1 | 12/2003 | Bischof et al. | |
| 7,233,948 | B1* | 6/2007 | Shamoon et al. | ..................... 1/1 |
| 7,477,740 | B2* | 1/2009 | Bennett | ........................ 380/210 |
| 2003/0070067 | A1* | 4/2003 | Saito | ............................. 713/150 |
| 2003/0145222 | A1* | 7/2003 | Gittler et al. | .................. 713/200 |
| 2003/0163431 | A1 | 8/2003 | Ginter et al. | |
| 2004/0123153 | A1* | 6/2004 | Wright et al. | ................. 713/201 |
| 2005/0076222 | A1* | 4/2005 | Olkin et al. | ................... 713/176 |

FOREIGN PATENT DOCUMENTS

| EP | 1 220 510 A2 | 7/2002 |
| GB | 2 398 712 A | 8/2004 |
| WO | 00/68764 | 11/2000 |
| WO | 01/71622 A1 | 9/2001 |
| WO | 2004/044713 A2 | 5/2004 |

* cited by examiner

*Primary Examiner* — Justin T Darrow
(74) *Attorney, Agent, or Firm* — Hewlett-Packard Patent Department

(57) ABSTRACT

A computer network has a number of resources. One or more trusted localization provider certifies the location of the resources. Encrypted data is closely associated with a policy package defining privacy policies for the data and metapolicies for their selection. A trusted privacy service enforces the privacy policies. The trusted privacy service is arranged to supply a key to a resource to allow that resource to process data if the trusted privacy service determines from the trusted localization provider certifying the location and other contextual information of the resource that the privacy policy allows processing of the data on that resource in that location.

13 Claims, 4 Drawing Sheets

SYSTEM AND METHOD FOR DYNAMICALLY ALLOCATING RESOURCES

SUMMARY OF INVENTION

The invention relates to dynamically allocating resources with privacy enforcement, and to methods, apparatus, networked systems and computer software for carrying out this task.

BACKGROUND ART

In modern networked computer systems, computing resources may be allocated dynamically based on business needs. The physical location of the resources can vary widely, and data is not necessarily stored on local data storage.

In such networked computer systems confidential computer information can be transferred widely. However, it is important to ensure that confidential information can only be accessed by suitable users, which may be determined geographically, by business function, or in many other ways.

Thus, some form of privacy management may be required.

However, as networked computer systems are increasingly based on dynamic processing assumptions privacy management based on static assumptions will no longer be adequate.

For example, EP 1 220 510 describes context aware computing. Devices and methods are provided that are context aware, in an example location aware, so that policies are evaluated as a function of context. EP 1 220 510 is particularly concerned with a way of encoding locations in a uniform way.

US 2003/0163431 describes a secure computing system for enforcing a secure handling and control chain.

Resource protection in distributed system is addressed in U.S. Pat. No. 6,658,573. The system use name resolution reducing direct access to a resource and controls the name resolution process for indirect access to a resource. An interception manager can prevent the resolution of some symbolic names in appropriate cases.

However, this approach only addresses the question of accessing resources not selecting resources to carry out tasks on a system with distributed processing and storage capacity and validating that those resources are authorised to carry out that processing.

SUMMARY OF INVENTION

In a first aspect, the invention relates to a method of dynamically allocating computing resources for a transaction related to data, comprising the steps of:
(a) receiving a request requiring a computing resource to process data to be processed;
(b) selecting, based on the data to be processed and contextual information a set of rules associated with the data to be processed;
(c) selecting a selected resource or resources to process the data and transmitting the data, in a protected or encrypted format, to the selected resource or resources;
(d) sending a message from the selected resource to a trusted privacy service requesting a key to decrypt the data to allow the data to be decrypted so that it can be processed on the selected resource;
(e) determining in the trusted privacy service whether the selected resource complies with the selected rules and if so sending a key from the trusted privacy service to the resource to allow the resource to decrypt the data and process the data.

In a second aspect, the invention relates to a computer system including:
a plurality of resources;
a network linking the resources;
at least one trusted localisation provider arranged to certify the location of the resource or resources;
a policy package associated with data defining different privacy policies for the data and metadata to select the relevant set of privacy policies;
at least one trusted privacy service arranged to enforce the privacy policies
a store storing confidential data in an encrypted fashion, wherein the encrypted data can only be decrypted using one or more keys; and
allocating resources to process the data;
wherein the trusted privacy service is arranged to supply one or more keys to a resource to allow that resource to process data if the trusted privacy service determines from the trusted localisation provider and the resource that the privacy policy allows processing of the data on that resource in that location.

The invention also relates to the various components of the computer system and methods of operating them, as well as computer program products arranged to carry out the method.

BRIEF DESCRIPTION OF DRAWINGS

For a better understanding of the invention, embodiments will now be described, purely by way of example, with reference to the accompanying drawings, in which.

DETAILED DESCRIPTION

Figure 1:
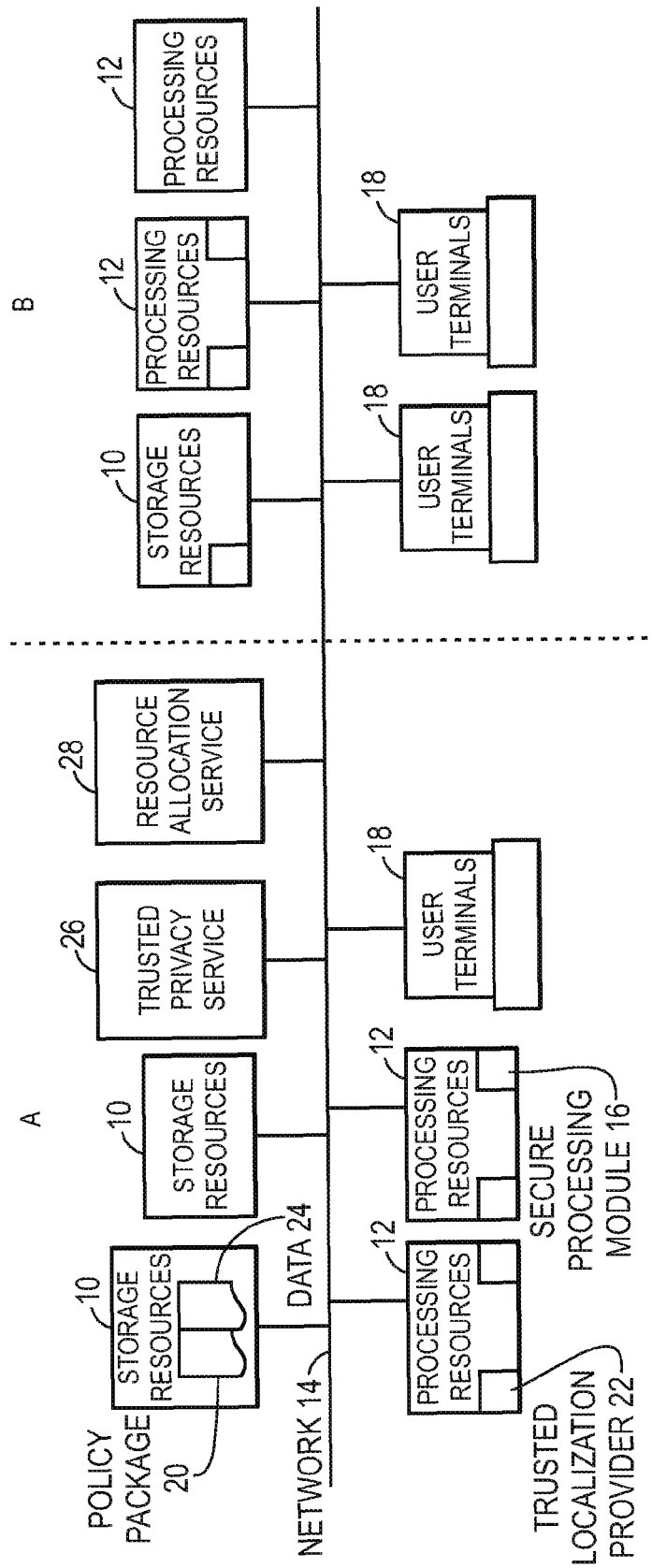
FIG. 1 is a schematic diagram of a first embodiment of the invention.

Referring to FIG. 1, a first example will be presented. This example is of a distributed computer system in two countries handling personal data subject to different privacy policies and legislation.

The first example is simple for ease of explanation and does not represent the full power of the approach described in the present specification.

The system includes storage resources 10, processing resources 12 and a network 14 linking the resources. These resources are located in two countries, country A, and country B. Some of the processing resources are secure processing resources having a secure processing module 16 within them. A number of user terminals 18 are also provided, which are also resources.

For simplicity, it will be assumed that the data stored is the salary, job description, work telephone number and email address of employees.

Depending on the country of employment, different privacy policies will be imposed by national law. Privacy laws and guidelines change according to location, geographical boundaries, contextual aspects, local customs/culture, etc. It is important to assess which "policy" applies at the point of data processing/transfer/disclosure.

For example, it may be assumed that country B has a national law preventing work telephone numbers being publicly available. Country A has no such law. Thus, depending on the country of employment of an employee, the work telephone number may be confidential information or not.

A policy package 20 describes the privacy policies of the data in a context aware manner. In this embodiment, a single policy package 20 is provided represented by a matrix listing the data field against the country of employment, and having an entry describing the confidentiality policy for the relevant data. For example, in the embodiment described, the policy package 20 may be described by metapolicies and a matrix as follows:

| Meta-policies: IF Processing_location = "Country A" THEN Apply_Policy1 ELSE Apply_Policy2 ELSE Deny_Access | | |
| --- | --- | --- |
| Information | Policy 1 | Policy 2 |
| Salary | Strictly Confidential | Strictly Confidential |
| Work Telephone | Not Confidential | Confidential |
| Email | Not Confidential | Not Confidential |
| Job Description | Not Confidential | Not Confidential |

The policy package 20 also includes a set of rules defining the privacy policies implied by the three confidentiality levels "Confidential", "Strictly Confidential" and "Not Confidential". In the example, metarules define how to select privacy policies based on location criteria.

In general, policies are much more complex than this. They may include logical constraints and conditions on time, location, identity/roles, credentials, properties. IT is a particular benefit of this and other embodiments that a wide variety of different policies can be implemented.

Note that the policy package 20 is closely associated with the data 24 represented by the policy package. Conveniently, this may be achieved by storing the policy package and the data 24 as a single file.

Preferably, the processing environment generally ensures that the policy package and data cannot be separated and maintains the integrity of the data item, i.e. the policy package and data.

These rules may be set out as an XML file. The package may be digitally signed. The package is stored in a secure environment, which may be determined by the system itself by allocating a very high security level to the policy package 20 so that it can only be processed by the trusted privacy server 26 (see below).

Data that is confidential, e.g. has a confidential level of "Confidential" or "Strictly Confidential", is stored in an encrypted format. The XML file may specify different encryption policies depending on the confidentiality level. For example, the minimum key length for "Confidential" may be less than for "Strictly Confidential" information. Further, suppose that in the example salary data may only be processed in the country of the employee. Much more complex policies might apply.

Each resource 10,12 that may be used for processing confidential data has a trusted localisation provider 22. This provides certified location of the resource, with different degrees of assurance (for example via signed certificates) stating the location of the resource. In this simple embodiment, the certificate is simply stored in a secure manner in the trusted localisation provider.

A trusted privacy server 26 is provided to check and enforce privacy policies based on the "policy package".

The requirements that need to be satisfied in order to access and process confidential data are determined by the policy package 20, as interpreted by the trusted privacy service 26. The trusted privacy service 26 can discriminate which resources can and cannot process associated confidential data. Further, the trusted privacy service 26 determines which privacy policies apply.

This is achieved by ensuring that confidential data is only transferred between resources in encrypted form. The only way that a resource can process the data is to decrypt the data using one or more decryption keys. The trusted privacy service 26 only provides the decryption key for specific data items to resources that are allowed to process those specific data items, based on the privacy policy. To process data, the resource 22 sends a message to the trusted privacy service 26 requesting a key. The trusted privacy service determines if the resource meets the appropriate privacy policy and only provides the key to the resource if it does. One or more trusted privacy services could be used.

For example, the privacy policy may be such as to require salary data only to be processed by resources in the country in question. Thus, in this case, the trusted privacy server will only issue the decryption key for specific items of salary data to resources for which the trusted localisation provider 22 located within the resource confirms that the resource is in the correct country, in accordance with the rules of the privacy policy.

Note that the data in the present case may include items of different sensitivity. These may be coded with a number of different keys. The trusted privacy service provides one or more keys as requested to a resource, if that resource may process the corresponding data according to the privacy policy.

The privacy policy may further require that the resource is a trusted resource that is able to securely process confidential data, and may further require that the resource only processes data in certain ways. For example, the privacy policy may require that salary data not be published and so only resources that provide suitable guarantees to the trusted privacy service regarding the security of the resource and the process to be carried out on the data will be provided with the decryption code for that data.

It is an important feature of this embodiment that the resources may be dynamically allocated so that processing and storage can be carried out where capacity is available.

In this example, resource allocation service 28 allocates resources to process persona/confidential data. When a resource is required, the resource allocation service identifies a potentially suitable resource and obtains from the trusted localisation provider the locality of the resource. Further information regarding the resource is obtained. This information is used to determine whether the resource is permitted to carry out the operation required. If so, the resource allocation service 28 allocates the resource and the resource interacts directly with the trusted privacy service to obtain access to the data, if required.

It will be noted that some operations, for example storage, do not require decryption. Nevertheless, the resource allocation server 28 still only selects resources meeting the requirements of the privacy policy, for example to store confidential data only on approved storage resources. In these cases however there is no need to decrypt the data at all so this is not done.

If the resource allocation server 28 determines from the trusted privacy server 26 that a resource is not suitable, the resource allocation server 28 tries to allocate a different resource until one is found that is suitable. If no suitable resource is found, an error message is generated.

In this way, resources are dynamically allocated on the basis of privacy and other rrquirements and contextual information. The privacy policies can be readily changed and updated by changing the policy package 20. Thus, the embodiment allows the ready enforcement of a variety of different requirements in a consistent and accountable way. The use of the trusted localisation provider 22 ensures that not merely the security requirements of a confidential server but also the correct processing location is used when required.

For example, if a user computer 18 attempts to access data, the user computer will only be allowed access to confidential data if the user computer has a suitable location, as determined by the trusted localisation provider, as well as a suitably secure processing facility.

Note that a benefit of the embodiment is that in the event of new rules regarding confidentiality related to certain pieces of data it is only necessary to change the privacy polices associated with that data.

Moreover, the system can readily cope with a very large number of different policy packages and policies since the policy package is associated with the data.

It should be noted that the trusted privacy module has a very different function to the privacy manager of EP 1220510, even if the name is similar. In EP 1220510, the privacy manager censors the location information transmitted by a mobile device, i.e. it ensures privacy of the location information. In contrast, in the embodiments, the trusted privacy module ensures privacy of the data by only releasing a key when the location of a resource is correct.

A further difference from EP 1220510 is that in EP 1220510 a predetermined set of policies are provided relating to the device. In the embodiments, different data may have entirely different policies. In addition the same data might be subject to different policies depending on the context. Thus, the flexibility of the approach described here is greater.

The entire process may be audited.

A second example will now be described with reference to FIGS. 2 to 5.

Figure 2:
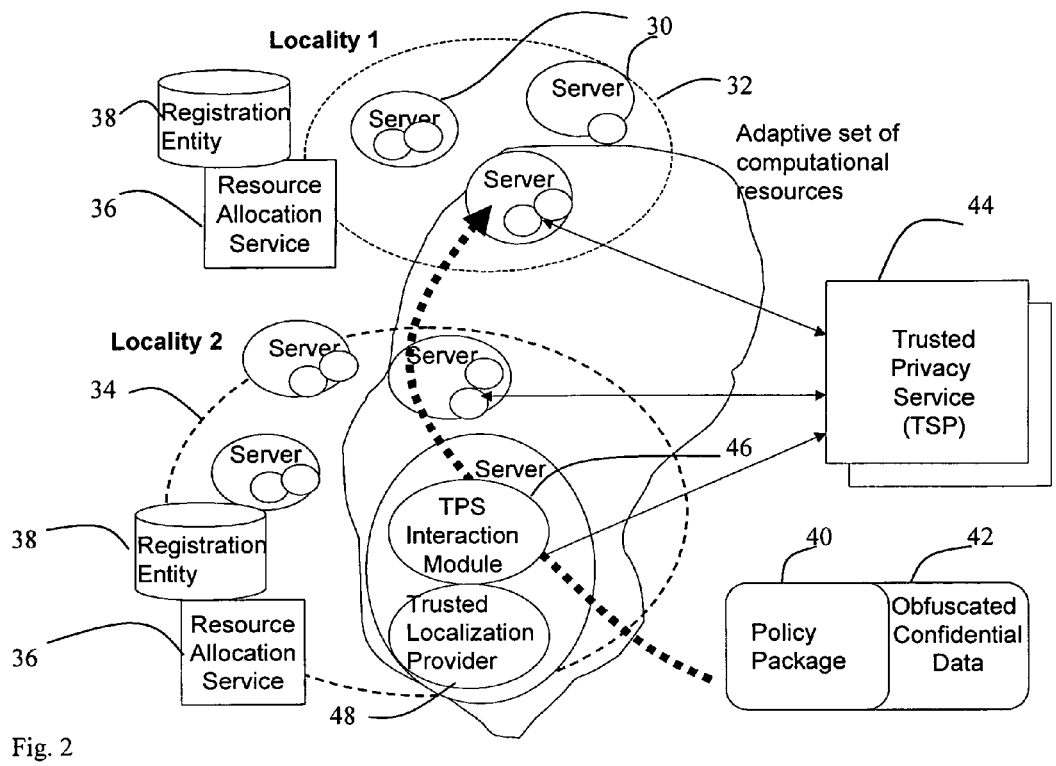
FIG. 2 is a schematic diagram of a second embodiment of the invention.

In this embodiment, a trusted platform approach is used. Referring to FIG. 2, a number of servers 30 are provided in first locality 32 and in a second locality 34. A resource allocation service 36 and a registration entity 38 are provided in each locality.

A policy package 40 is strongly associated with confidential data 42 which may however be stored and executed on any of the servers 30. A Trusted Privacy Service (TPS) 44 is provided to police the privacy rules. Resources need to interact with the TPS 44 to process the confidential data, and to this end the resources have a TPS Interaction Module 46 for carrying out this interaction. The resources further include a trusted localisation provider (TLP) for providing localisation information about the resource.

Figure 3:
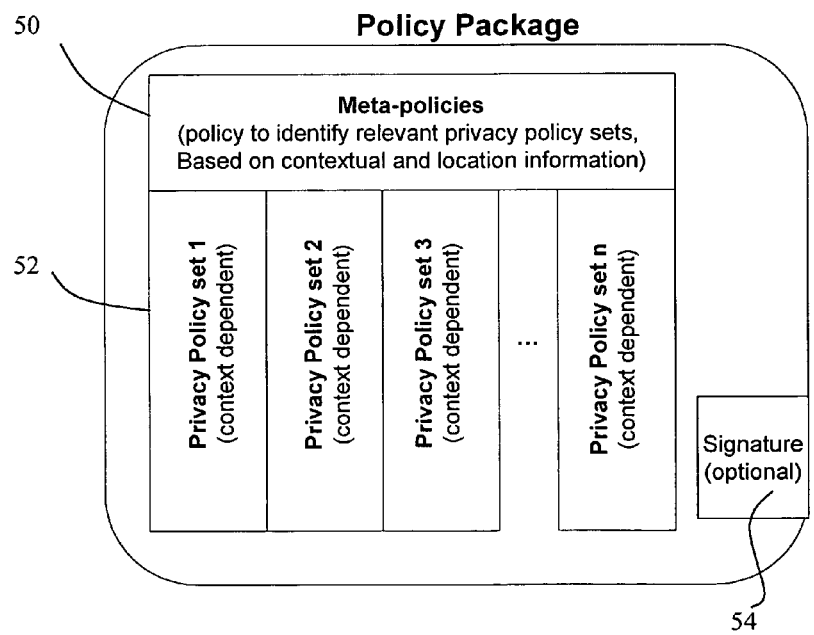
FIG. 3 is a schematic diagram of a detail of the second embodiment.

FIG. 3 shows a policy package 40. Note that in this embodiment the policy package is closely associated with the confidential data 42 and sets out the rules for processing that data. The system may include other data with other policy packages, and indeed it is a benefit of this mbodiment that it is easy to apply very different policies to different data, and in the event that new data requires new policies, these can be determined when the new data is created and simply attached to the data.

The policy package 40 contains meta policies 50 together with specific policies 52 and optional signature 54. The policy package 40 is in essence a data document that stores the policies. The policies are sets of logical rules that may be expressed in any convenient way, as will be known to those skilled in the art. For example, the policies may be expressed as digitally signed XML data.

Suitable standards for recording such rules include the Extensible Access Control Markup language (XACML). Alternatively, the Enterprise Privacy Authorization language (EPAL) might be used.

The meta-policies 50 are policies that specify the selection of a particular one of the policies for data depending on selection criteria. Thus, one policy may be selected if data is processed in one locality, and a different policy if data is processed in another locality.

The privacy policies 52 themselves are rules that determine how data is to be processed. For example, if the data is being processed outside the locality in which the data was created, certain activities may be prohibited, for example printing the data or outputting it in any way. For more secure types of data, the rule may specify that the data can only be processed on a trusted platform.

The association of data and policy package can be assured using cryptographic techniques, for example by encrypting the data. The integrity of policies and metapolicies can be enforced by a number of techniques, including in particular signatures and enveloping techniques.

The functions of the registration entity 38 and resource allocation service 36 will now be described.

The registration entity 38 includes a list of available resources, which may be all or some of the resources. In the example of FIG. 2, a separate registration entity 38 is provided in each of the first and second localities 32, 34 to allocate resources in that locality. The registration entity 38 also contains details of other registration entities that may be able to allocate resources.

The registration entity 38 obtains localisation information from the servers using the trusted localisation provider (TLP) 48 installed on each of the resources 30.

In some cases, the resources will not have TLPs installed, and in others only some of the resources will have TLPs installed. In these cases the registration entity can manage in a centralised manner the localisation information, and may for example act as the TLP for these resources.

When resources are required, for example to carry out a processing task on data, the resource allocation service identifies resources based on the policy package 40 associated with the data 42 and the information in the registration entity 38 about its resources. In the event that resources under the control of other registration entities 38 and resource allocation services 36 are required, the data regarding these too is obtained from the registration entity 38.

Note that in the example there is one registration entry 38 for each resource allocation service 36 though this is not required, so long as there i-s at least one resource allocation service in the network.

In alternate embodiments the registration entity 38 is dispensed with and allocation is made "on the fly". When the resource allocation service needs to process a resource, potential resources 30 are identified by the resource allocation service and the resource 30 itself checks whether it can carry out the required processing, using the TLP within the resource and the policy package 40 associated with the data.

Figure 4:
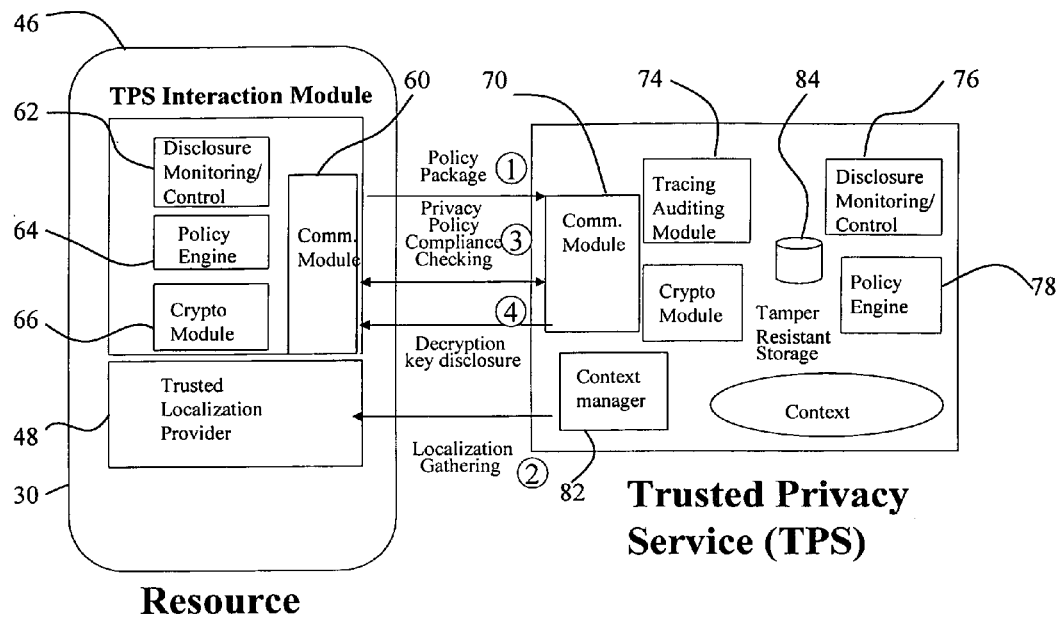
FIG. 4 is a schematic diagram of a further detail of the second embodiment.

The interaction of the Trusted Privacy Service 44 with the resource 30 will now be discussed with reference to FIG. 4.

The resource 30 includes a TLP 48 and a TPS Interaction module 46. The TPS Interaction Module 46 includes a communications module 60 for communicating with the TPS 44, a disclosure monitoring and control module 62, a policy engine 64 and a cryptographic module 66 for decrypting data.

The TPS includes a communications module 70 for communicating with resources 30 and a cryptographic module 72 for decrypting data when required. A Tracing/Auditing module 74 records the operation of the TPS 44. A disclosure monitoring and control module 76 controls disclosure of data, and a policy engine 78 enforces policies.

A context manager 82 is provided to gather contextual information from the resrouce 30 and process the relevant set of privacy policies.

The TPS includes secure tamper resistant storage 84.

To explain the functions of these modules, the processing of data by the resource will now be described.

In order for a resource 30 to process data it needs to decrypt it. The resource 30 sends the policy package 40 associated with the encrypted data 42 to the TPS 44. The context manager 82 then gathers contextual information from the TLP of the resource 30 that identifies the location of the resource. The context manager 82 may also gather data for example from the policy engine 64 of the resource or elsewhere to check which policy package are to be implemented. The exchange between the context manager 82 and the resource 30 is logged by the Tracing Auditing module 74.

In the event that the resource 30 satisfies the privacy policies of the policy package 40, the trusted privacy service 44 uses the cryptographic module 72 to generate the keys needed to access the confidential data 42 and sends them to the resource 30 to allow the resource to decrypt and process the data.

Figure 5:
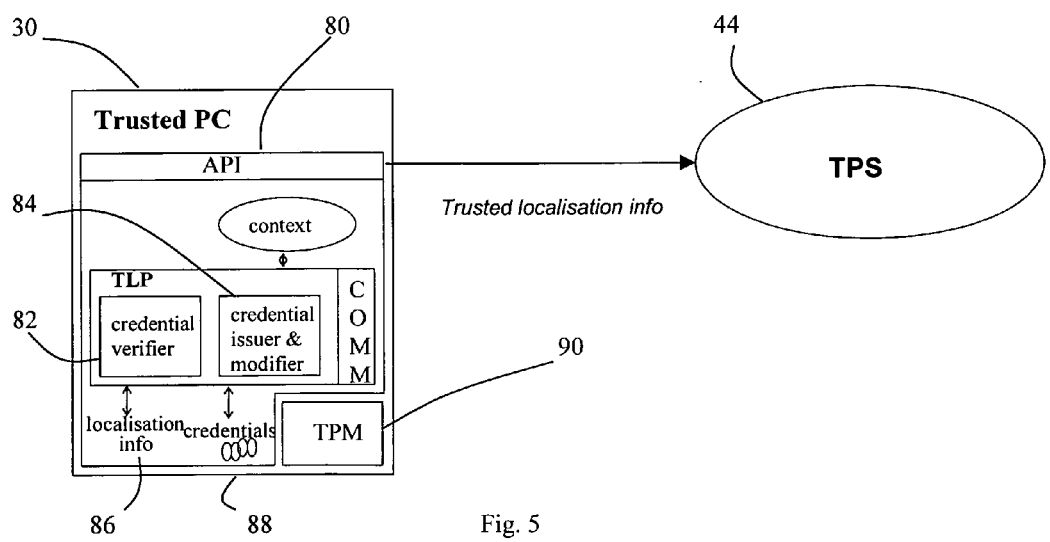
FIG. 5 is a schematic diagram of a yet further detail of the second embodiment.

FIG. 5 shows a trusted server 30 with a trusted localisation platform (TLP) 48. The TLP 48 is implemented as software having a trusted localisation software which certifies or provides localisation information through an Application Program Interface (API) 80. The TLP 48 includes a credential verifier 82 and a credential issuer and modifier 84. The TLP 48 gets localisation information 86 which may be the machine access control (MAC) or IP address of the platform together with various credentials 88. The localisation information is supplied to the TPS 44.

In some embodiments, this will be sufficient but in the embodiment described a trusted privacy module (TPM) 90 is provided to improve the trust. In the embodiment now being described, this is a hardware module for security, though this may not be essential in all applications.

The trusted privacy module 90 certifies the localisation information and thereby improves the credence of that information.

The information about the location of the resource may be obtained in one of a number of ways. The information may be obtained from network information relating to the location of the resource with a network. The location information is not necessarily purely geographic. For example, the localisation information may determine whether the computing resource is attached directly to a company network by a secure fixed link, or alternatively attached to the network by a less secure route, for example by a WiFi port or through the internet.

Other known ways of establishing location, for example the global positioning system, may also be used if pure geographic information is required.

In many arrangements, a variety of these approaches will be adopted.

Figure 6:
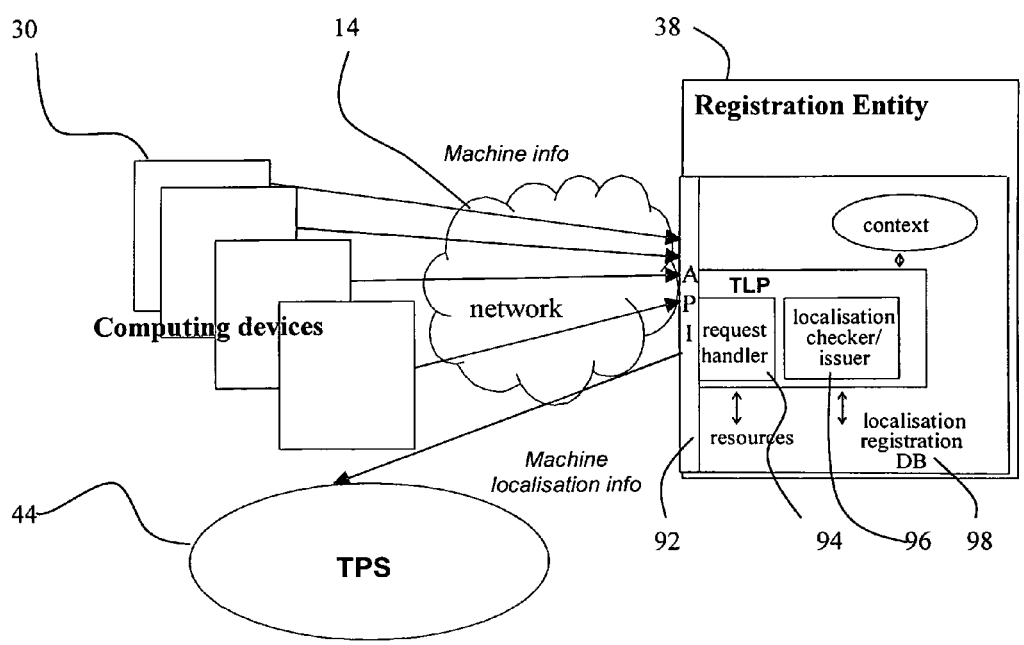
FIG. 6 is a schematic diagram of a third embodiment.

FIG. 6 shows an alternative approach to the trusted localisation platform which may be adopted in a third embodiment. In this approach, as shown in FIG. 6, the TLP is provided in the registration entity.

In this case, the software TLP 48 has an API 92 and a request handler 94. A localisation checker/issuer 96 associates localisation information with resources 30. Information regarding these resources 30 is taken from the resource and stored in the database 98. It is supplied from there directly to the TPS 44.

This has a significant benefit, in that the information is centralised. Further, the registration entity 38 may be run on a trusted platform which can enhance the reliability and verifiability of the localisation information.

Note that in alternative arrangements, some TLPs may be TLPs in the resources 30 as in the second embodiment as shown in FIG. 5 and others TLPs may be provided in the registration entities 38 as in FIG. 6.

The various components of software used to implement the various parts of the invention may be stored in any convenient data carrier, such as a hard disk, etc. For security, the data carrier may be a ROM or other data carrier that cannot easily be altered.

In these approaches, the servers 30, registration entity 38, resource allocation 36, and trusted privacy service 44 may all be run on a trusted platform (TP).

The operation of a TLP on a trusted platform will now be described. Note that this approach may be applied wherever the TLP is located, including the cases that the TLP is on the resource 30 as in FIG. 5 or on the registration entity 38 as in FIG. 6. The specific case where a Trusted Platform Module 90 is used is analysed. Other approaches to enhance the operation of TLP using trusted hardware could be used without necessarily requiring the usage of Trusted Platform Module 90.

In the specific case where a Trusted Platform Module 90 is used, the software (running on the resource) could operate in conjunction with the TPM 90 as follows. Whenever new localisation information is to be created on the resource, the TLP instructs the TPM to create a new public key pair based on random sources comprising a new public key and a new private key. For security, the private key is never revealed outside the TPM, and the TLP will request the TPM to form any operations involving it.

This private key, that is uniquely associated to and only accessible by the TPM, can be used to sign and certify attributes related to the resource and the trusted platform. This allows the TLP to ask the TPM to sign using this key. This uses functionalities specified by Trusted Computing Group (TCG) such as non-migratable keys to give a strong binding between the localisation information and the platform and to protect these keys by the TPM.

As defined by TCG third parties could publish integrity metrics of (parts of) the TLP mechanism so that its correct operation could be checked as part of the (resource) boot integrity checking process, or in response to a challenge. The TPM could sign some of the generated information if appropriate; if desired, information about the software state of the platform could be included together with this signed data.

An association is created between the identity of the trusted platform in the registration entity and localisation information. This information may be queried by third parties.

To provide further assurance (for example, in case where information has to flow across multiple domains) an attribute certificate could be created in the registration entity 38 certifying that a resource holding the certificate has certain attributes, possibly including its locality. The certificate includes the new public key.

The information from the TLP 48 that is to be sent is signed by sending the information to the TPM 90 for signature. This signature certifies the localisation information sent.

By using such a certificate the localisation is bound to the platform and the certificate acts as evidence that a trusted privacy module signed the localisation information thereby guaranteeing the localisation information.

More details follow about the trusted privacy module.

The trusted privacy module has a data storage key for storing data. Only the trusted privacy module knows the key ensuring that other components cannot access the data. This key may be migratory, i.e. usable on all platforms, or non-migratory, i.e. only usable on the platform of that particular trusted privacy module.

This data storage key may be used to protect a signature key in the trusted privacy module so that only the trusted privacy module can access the signature key to use it to sign data.

The trusted privacy module approach may also be used to ensure that the signed localisation data is not disclosed in an environment not believed to be safe.

In the present case, the signature key used by the trusted privacy module to sign data is non-migratory, so that the recipient of a certificate signed by the signature key is assured that the signing key was used on the correct trusted privacy module.

In alternative arrangements using a migratory signature key then the user of the signature key must be relied upon to ensure that it is not used outside a trusted privacy module.

The embodiments described above can ensure, with suitable privacy policies, that confidential data is processed only on resources that satisfy privacy policies relevant to the data.

Note that in preferred embodiments the various "trusted" services use trusted platforms implemented in hardware and software. However, the invention is applicable to software based systems also where such systems can provide sufficient security. In this context the word "trusted" when referring to a service means that the entity accessing that service has confidence that the service will behave in the expected manner for the intended purpose. Judgements can be made based on evidence on a combination of social trust and integrity information about the state of the platform.

The invention claimed is:

1. A method comprising:
   receiving a request requiring a computing resource to process data to be processed;
   selecting, based on the data to be processed and contextual information, one of a set of rules for processing the data;
   selecting a resource or resources to process the data and transmitting the data, in an encrypted format, to the selected resource or resources; and
   sending a message to a trusted privacy service requesting a key to decrypt the data to allow the data to be decrypted so that it can be processed on the selected resource or resources if the trusted privacy service determines that the selected resource or resources complies with the selected rule.

2. A method according to claim 1 wherein the trusted privacy service receives data from a trusted localization provider which provides certified data regarding the location of the resource or resources.

3. A method according to claim 1 wherein the rules are stored as a privacy package closely associated with the data, the privacy package identifying for the data rules allocating the processing and/or storage of data in a resource depending on the properties of the resource, including the location of the resource.

4. A method according to claim 1 wherein some data is only to be processed on a trusted platform; the method including creating localization information on the trusted platform by: creating a new key pair including a new public key and a new private key, the new private key being kept on the trusted platform; and using the private key to certify or sign the localization information.

5. A computer system comprising:
   at least one trusted localization provider arranged to certify the location of a resource;
   a policy package associated with data, defining different privacy policies for the data, and metadata to select the relevant set of privacy policies from the different privacy policies for the data;
   at least one trusted privacy service arranged to enforce the privacy policies; and
   storage adapted to store confidential data in an encrypted fashion, wherein the encrypted data can only be decrypted using one or more keys, wherein the trusted privacy service is arranged to supply one or more keys to the resource to allow that resource to process data if the trusted privacy service determines that the privacy policy allows processing of the data at the resource.

6. A computer system according to claim 5 wherein the at least one trusted localization provider is provided in the resource.

7. A computer system according to claim 5 comprising:
   a registration entity arranged to store data relating to the resource; and
   a resource allocation server arranged to allocate the resource to process data based on information stored in the registration entity.

8. A computer system according to claim 5 wherein data is stored in an encrypted form together with and closely associated with the privacy policy of that data.

9. A computer system according to claim 5 wherein the resource includes a trusted privacy module and the trusted localization provider, the trusted privacy module in the resource being arranged to digitally sign localization data provided by the trusted localization to certify the localization data.

10. A tangible non-transitory computer readable medium comprising:
    code adapted to receive a request requiring a computing resource to process data to be processed;
    code adapted to select, based on the data to be processed and contextual information, one of a set of rules for processing the data;
    code adapted to select a resource to process the data and transmitting the data, in an encrypted format, to the selected resource; and
    code adapted to send a message to a trusted privacy service requesting a key to decrypt the data to allow the data to be decrypted so that it can be processed on the selected resource or resources if the trusted privacy service determines that the selected resource or resources complies with the selected rule.

11. The tangible non-transitory computer readable medium, as set forth in claim 10, wherein the trusted privacy service receives data from a trusted localization provider which provides certified data regarding the location of the resource.

12. The tangible non-transitory computer readable medium, as set forth in claim 10, wherein the rules are stored as a privacy package closely associated with the data, the privacy package identifying for the data rules allocating the processing and/or storage of data in a resource depending on the properties of the resource, including the location of the resource.

13. The tangible non-transitory computer readable media, as set forth in claim 10, wherein some data is only to be processed on a trusted platform; the method including creating localization information on the trusted platform by: creating a new key pair including a new public key and a new private key, the new private key being kept on the trusted platform; and using the private key to certify or sign the localization information.

* * * * *

UNITED STATES PATENT AND TRADEMARK OFFICE
CERTIFICATE OF CORRECTION

| | | |
|---|---|---|
| PATENT NO. | : 9,137,113 B2 | Page 1 of 1 |
| APPLICATION NO. | : 11/335877 | |
| DATED | : September 15, 2015 | |
| INVENTOR(S) | : Marco Casassa Mont et al. | |

It is certified that error appears in the above-identified patent and that said Letters Patent is hereby corrected as shown below:

In the Specification

In column 1, line 35, delete "use" and insert -- uses --, therefor.

In column 5, line 5, delete "rrquirements" and insert -- requirements --, therefor.

In column 5, line 60, delete "mbodiment" and insert -- embodiment --, therefor.

In column 6, line 54, delete "i-s" and insert -- is --, therefor.

In column 7, line 10, delete "resrouce" and insert -- resource --, therefor.

In the Claims

In column 10, line 66, in Claim 13, delete "media," and insert -- medium, --, therefor.

Signed and Sealed this
Third Day of May, 2016

Michelle K. Lee
*Director of the United States Patent and Trademark Office*